(12) United States Patent
Flugrad, Jr. et al.

(10) Patent No.: US 7,118,512 B2
(45) Date of Patent: Oct. 10, 2006

(54) SELF-ACTUATING, TRACTION-DRIVE SPEED CHANGER

(75) Inventors: Donald R. Flugrad, Jr., Ames, IA (US); Abir Z. Qamhiyah, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 242 days.

(21) Appl. No.: 10/363,896

(22) PCT Filed: Sep. 6, 2001

(86) PCT No.: PCT/US01/27656

§ 371 (c)(1), (2), (4) Date: Mar. 7, 2003

(87) PCT Pub. No.: WO02/21017

PCT Pub. Date: Mar. 14, 2002

(65) Prior Publication Data

US 2004/0023754 A1    Feb. 5, 2004

(51) Int. Cl.
*F16H 37/00* (2006.01)

(52) U.S. Cl. .............................. 476/33; 476/39; 476/65; 74/354

(58) Field of Classification Search ................ 475/183; 74/353, 354; 476/33, 36, 39, 65
See application file for complete search history.

(56) References Cited

U.S. PATENT DOCUMENTS

| | | | |
|---|---|---|---|
| 3,254,546 A * | 6/1966 | Nasvytis | 475/183 |
| 3,367,214 A * | 2/1968 | Nasvytis | 475/183 |
| 3,433,099 A | 3/1969 | Nasvytis | |
| 3,475,993 A | 11/1969 | Hewko | |
| 4,128,016 A | 12/1978 | Nasvytis | |
| 4,487,090 A * | 12/1984 | Burnham | 475/183 |
| 4,617,838 A | 10/1986 | Anderson | |
| 4,813,303 A | 3/1989 | Beezer et al. | |
| 4,950,110 A | 8/1990 | Suzuki | |
| 5,021,035 A | 6/1991 | Zhou | |
| 5,238,459 A * | 8/1993 | Andre | 475/183 |
| 5,688,201 A | 11/1997 | Zhou | |
| 5,851,163 A * | 12/1998 | Kawase et al. | 475/183 |
| 5,873,786 A | 2/1999 | Hosoya et al. | |

(Continued)

FOREIGN PATENT DOCUMENTS

JP    58-180868    * 10/1983

OTHER PUBLICATIONS

Nicholas P. Chironis, Neil Sclater; Precision Ball Bearings Replace Gears in Tiny Speed Reducers; Mechanisms & Mechanical Devices Sourcebook; Circa 1970; pp. 252, 304 & 309; Second Edition, McGraw-Hill, New York.

(Continued)

*Primary Examiner*—David M. Fenstermacher
(74) *Attorney, Agent, or Firm*—McKee, Voorhees & Sease, P.L.C.

(57) ABSTRACT

A self-actuating traction drive speed changer has a movable force input element having a planar drive surface, and a movable force output element having a planar drive surface which is connectable to an output load. One or more movable roller elements has a planar drive surface operatively connected for movement to the input element, and are in frictional engagement with the planar drive surface of the output element so that movement of the input element will cause the planar drive surface of the roller element to engage and frictionally move the output element.

33 Claims, 12 Drawing Sheets

U.S. PATENT DOCUMENTS

| | | |
|---|---|---|
| 5,876,298 A | 3/1999 | Kato et al. |
| 5,893,813 A | 4/1999 | Yamamoto |
| 5,896,774 A | 4/1999 | Funahashi et al. |
| 5,901,802 A | 5/1999 | Sunohara et al. |
| 5,947,854 A | 9/1999 | Kopko |
| 6,076,413 A | 6/2000 | Verot et al. |
| 6,095,940 A | 8/2000 | Ai et al. |
| 6,125,717 A | 10/2000 | Phillips |
| 6,148,605 A | 11/2000 | Lardellier |
| 6,162,145 A | 12/2000 | Wang |
| 6,202,507 B1 | 3/2001 | Phillips |
| 6,225,265 B1 | 5/2001 | Shibuya et al. |
| 6,436,000 B1 * | 8/2002 | Minegishi et al. .......... 475/183 |
| 2002/0111243 A1 * | 8/2002 | Minegishi et al. .......... 475/178 |
| 2004/0162175 A1 * | 8/2004 | Ai .............................. 475/183 |

OTHER PUBLICATIONS

P.D. Balakin & A.V. Borodin; Kinematic Joint For The Drive Of Piston Micromachines; Soviet Engineering Research; 1989; pp. 40-42; vol. 9, No. 10; Allerton Press, Inc.

Controlling Speed With Mechanical CVTs; Machine Design; 1981; pp. 89-96.

New CVT Hits The Road; Popular Science; Jan. 2000; p. 40.

Driveline Components; Machine Design, Jun. 18, 1981; pp. 7-13.

Traction Drives Roll Up Impressive Gains; Machine Design; Oct. 24, 1985; pp. 68-75.

* cited by examiner

SELF-ACTUATING, TRACTION-DRIVE SPEED CHANGER

This application is a national stage entry of PCT/US01/27656 filed on Sep. 6, 2001 which claims the benefit of U.S. Provisional Application No. 60/231,115 filed on Sep. 8, 2000.

BACKGROUND OF THE INVENTION

Most speed changers in use today utilize gears to produce an output speed different than the input speed. Gears require the manufacture of precise shapes for the teeth to satisfy the fundamental law of gearing which insures a constant speed ratio for the system. If the gears are to be used in a transmission, special provision must be made so the speed ratio can be changed without causing gear teeth on one gear to clash with those on the mating gear.

There are, however, other types of speed changers in use including traction drive speed changers. These depend on friction between rolling elements to transmit torque from the input member to the output member. The rolling elements are held together with a prescribed normal force to generate the required friction force based on the power to be transmitted by the device. However, these devices are not self-actuating. Further, these devices often require a separate clutch to allow the output to be disengaged from the input.

It is therefore a principal object of this invention to provide a traction drive speed changer which is self-actuating.

It is a further object of this invention to provide a traction drive speed reducer that does not require a clutch.

A further object of this invention is to provide a self-actuating traction drive speed changer wherein the normal force on the roller members is only present when needed to permit the rolling elements to be operationally disengaged.

A still further object of this invention is to provide a self-actuating traction drive speed changer which can be easily engaged and disengaged in response to changing speed requirements.

These and other objects will be apparent to those skilled in the art.

SUMMARY OF THE INVENTION

A self-actuating traction drive speed changer has a movable force input element having a planar drive surface, and a movable force output element having a planar drive surface which is connectable to an output load. One or more movable roller elements has a planar drive surface operatively connected for movement to the input element, and are in frictional engagement with the planar drive surface of the output element so that movement of the input element will cause the planar drive surface of the roller element to engage and frictionally move the output element.

A modified form of the invention mounts the input and output elements on one each of a pair of spaced support elements. An elongated link having a center and opposite ends is pivotally secured at its center to one of the support elements. One each of first and second roller elements are secured to the ends of the link with each roller element having a planar drive surface. The planar drive surface of the first roller element is in friction driving engagement with the planar surface of the input element. Rotation of the input element will rotate the first roller to pivot the link so that the planar drive surface of the second roller will engage the planar drive surface of the output element to rotate the output element.

DESCRIPTION OF THE PREFERRED EMBODIMENT

Figure 1:
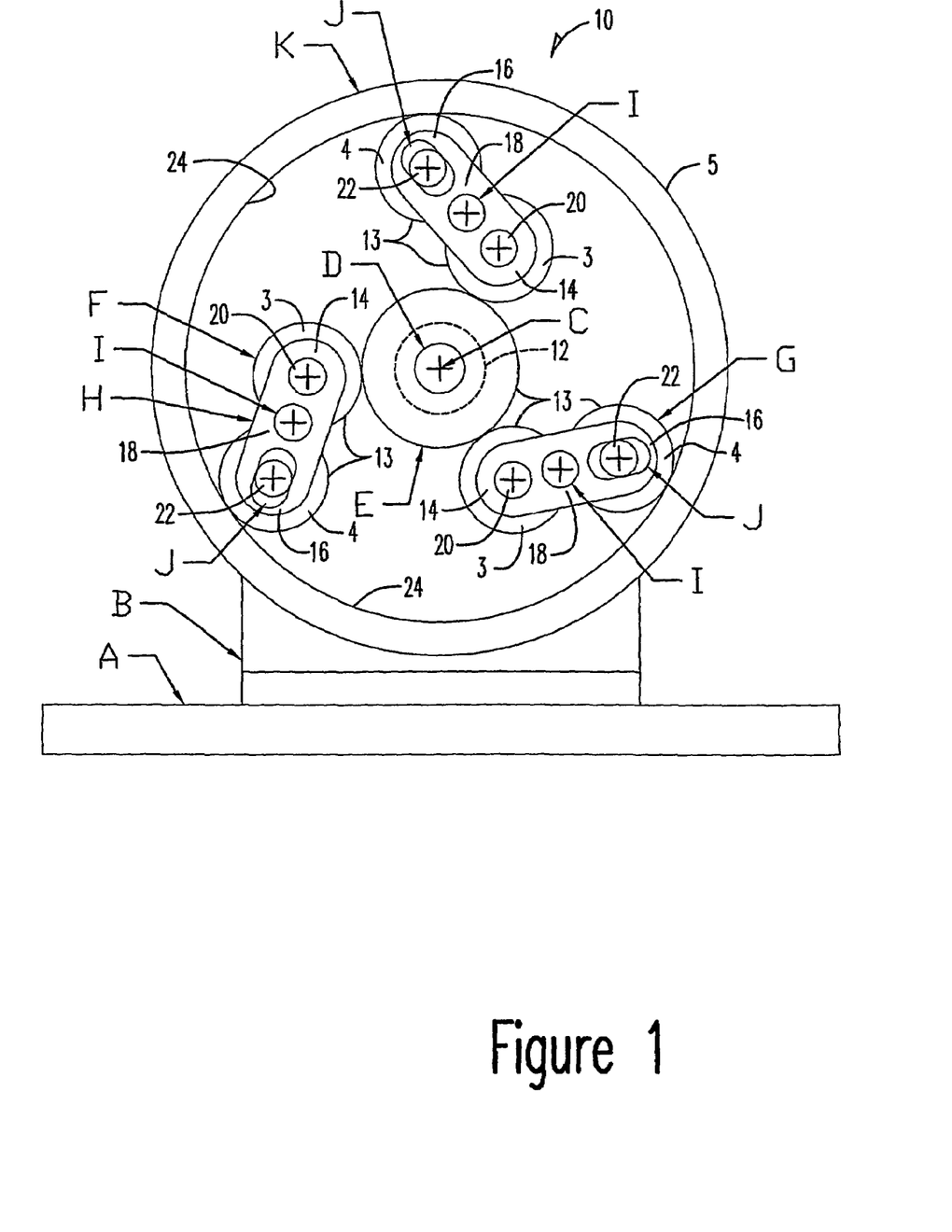
FIG. 1 is an elevational view of the speed changer of this invention.

With reference to FIG. 1, the speed changer 10 has a horizontal base mounting plate A to which is rigidly mounted a vertical back mounting or support element B. A bearing 12 having a center axis C supports force input shaft D. A roller E is cylindrical in shape and is rigidly mounted on shaft D. Roller E has cylindrically shaped planar drive surface 13. The term "planar drive surface" as used herein designates a relatively smooth "non-tooth" surface, such as the exterior surface of a geometric cylinder or cone. Inner roller F and outer roller G (also denominated as "3" and "4", respectively) are rotatably mounted on the inner and outer ends 14 and 16, respectively, of links H. (Cylinders or conical shapes can be used.) Links H are pivotally mounted at their center 18 on center pins I. Pins I are mounted in radially extending slots 19 on a middle supporting plate A1 (FIG. 2) which in turn is secured any convenient way (not shown) to base A. In FIG. 1, the pins I are mounted on plate B, for plate A1 is removed. Inner and outer rolls F and G are rotatably mounted by pins 20 and 22, respectively, to the respective ends 14 and 16 of links H. (In both FIGS. 1 and 2.)

Figure 2:
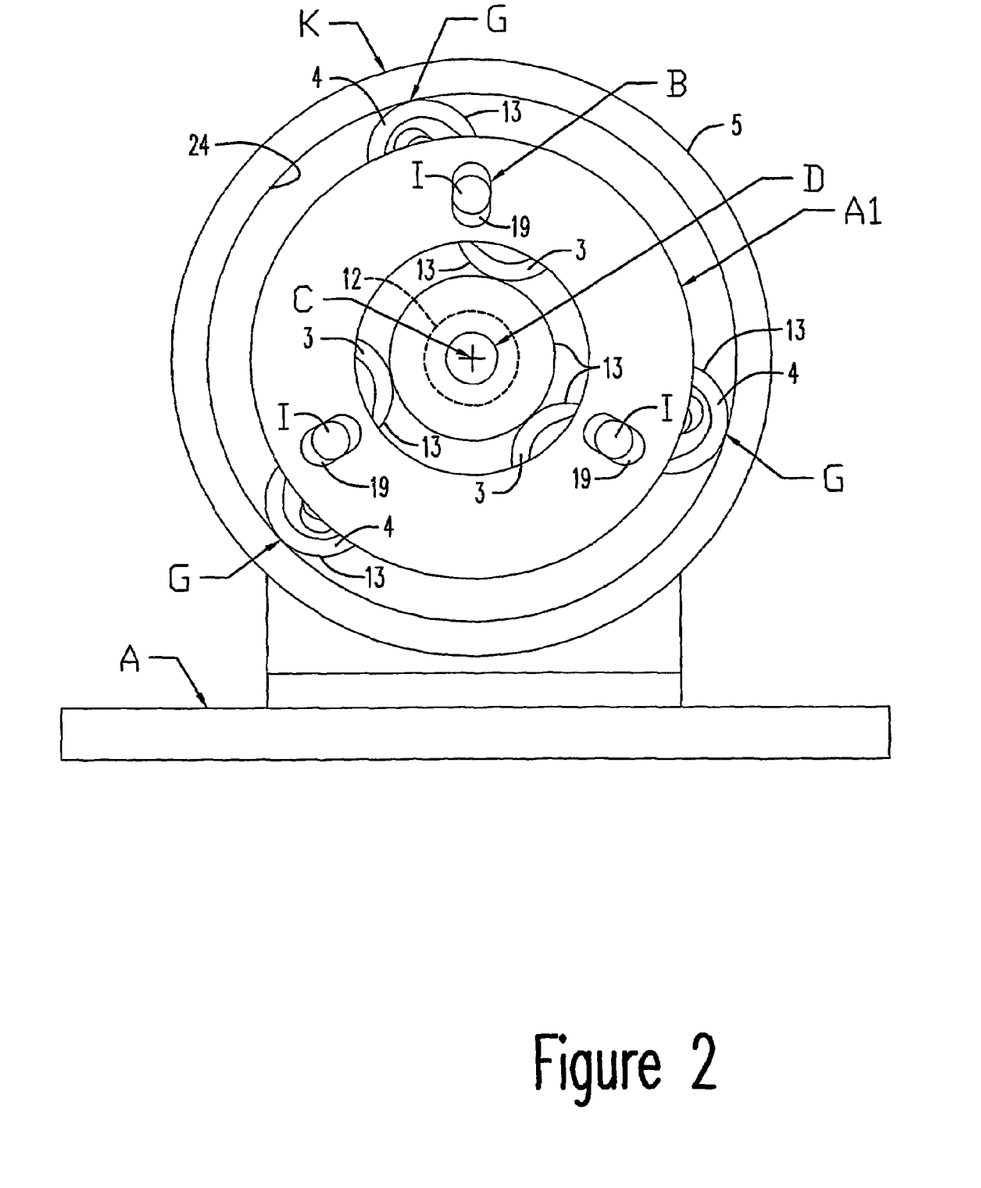
FIG. 2 is an elevational view similar to that of FIG. 1 with a support plate shown thereon.

Slots J on the outer ends of link H receive the pins 22 of outer rollers G. Slots J (FIG. 1) allow the inner and outer rollers F and G to press against one another, generating sufficient torque to transmit through the unit. Each of the inner and outer rolls F and G have a planar drive surfaces 13. The links H and inner and outer rollers F and G are free to rotate about pins I, with the center axes of pins I being the axes of rotation of the links.

In FIG. 2, the slots 19 are elongated to allow the links H and the inner and outer rollers F and G to seek a configuration with the inner roller F pressed firmly against the input roller E, and the output roller G pressed firmly against the inner surface of output roller K. The inner surface 24 of output roller K is a planar drive surface.

As the input shaft D and roller E rotate counterclockwise, the links H and rollers F and G rotate clockwise and the pins I move radially outwardly in their respective slots 19. Because of the inclined orientation angle of the intermediate roller assemblies (inks H and rollers F and G), the clockwise torque generated on the output roll K by the output load produces the necessary normal forces to press the rolling members against one another. This in turn creates sufficient friction between rolling elements to prevent slip. Furthermore, the angle of inclination is designed for the expected coefficients of friction to ensure that slip will not occur no matter what the output load. Hence, the traction effect is automatically achieved at just the right level to transmit the instantaneous torque required for the unit.

Figure 3:
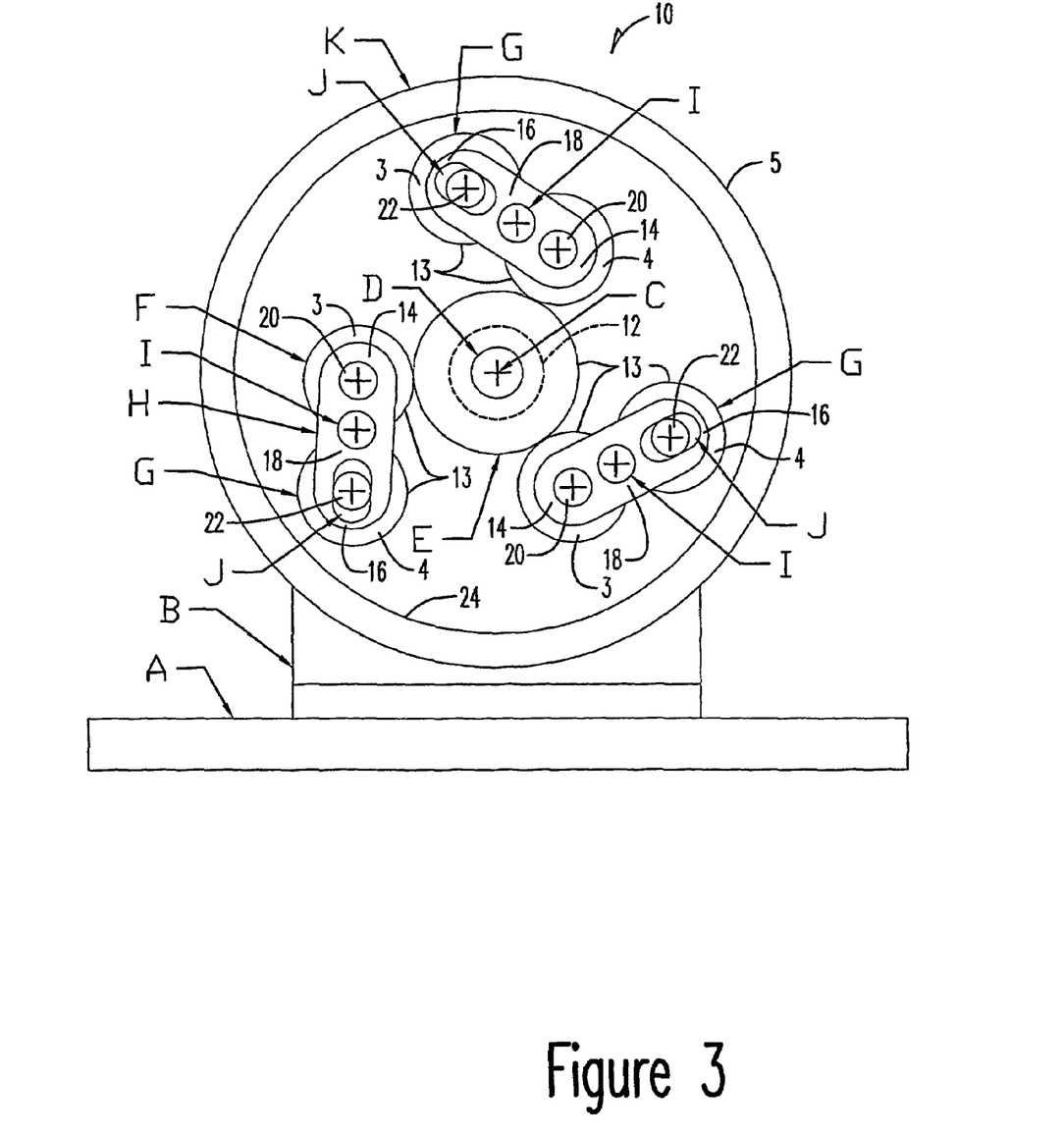
FIG. 3 is an elevational view similar to that of FIG. 1 but shows the roller elements in a state of physical separation or disengagement with the output element.

FIG. 3 shows the assembly of FIG. 1 in an "overrun" mode when the speed of rotation of output roller K has risen to a given level, and the speed of rotation of input shaft D has been reduced from its initial speed. In that situation, the output rollers "disengage" the surface 24 and no longer convey rotational power to K. The term "disengage" herein refers to withdrawing rotational power, and not necessarily withdrawing physical contact. In either situation, the output element K continues to rotate ("coast") at its given speed even though the speed of input element D is decreased or eliminated.

The geometry of the device is designed so that, given a specific coefficient of friction between the various contacting surfaces, the appropriate normal force will be induced, which will allow the required tractive force to be generated. Thus, the device will not slip, no matter how much load is applied to the output member. Parts will fracture before slippage occurs.

DESCRIPTION OF FIRST ALTERNATIVE EMBODIMENT OF THE INVENTION

Figure 4:
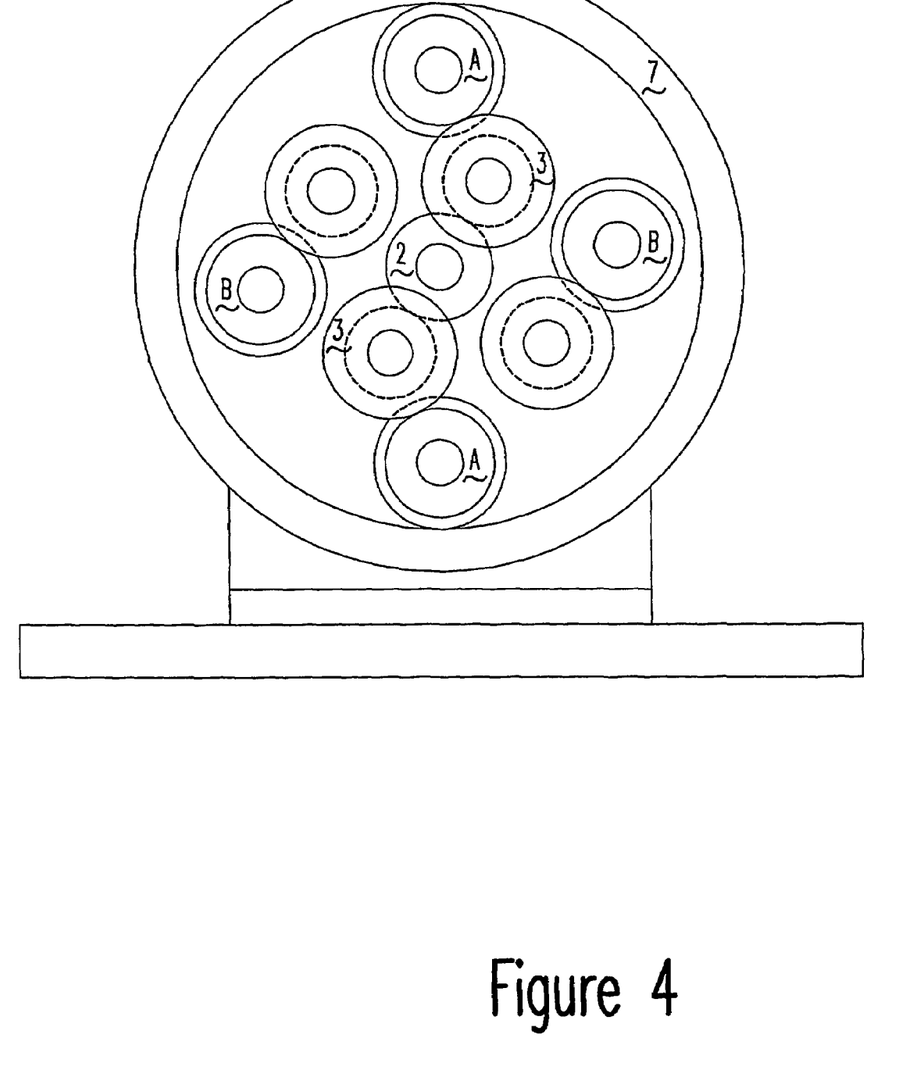
FIG. 4 is an elevational view similar to that of FIG. 1 but shows the use of additional roller elements suitable for use in a transmission environment.

FIG. 4 shows an embodiment of the invention that is used for a transmission with two different speed ratios. Along a vertical line are two intermediate roller assemblies with outer rollers labeled A, and along a horizontal line are two other intermediate roller assemblies with outer rollers labeled B.

The A set of rollers is shown engaged while the B set of rollers is disengaged. The general idea is that the diameters of the A set of rollers are designed to be different than the B set of rollers. This produces different speed ratios for the two sets of rollers. Thus, the device is shifted from one speed to another by disengaging by any convenient means (not shown) the A set of rollers and engaging the B set of rollers. More than two sets of rollers can be included in the device, allowing for more than two speed ratios.

It should be noted that for this configuration, the output member rotates in the same direction as the input member. It should also be noted that for the configuration shown in FIGS. 1–4, the input member must rotate counterclockwise to drive the output member through the intermediate roller assemblies. If the input member rotates clockwise, the output member will not rotate because the intermediate roller assemblies are inclined to self actuate for counterclockwise rotation.

If the input member rotates counterclockwise driving the output member counterclockwise, and the output member speeds up in a counterclockwise direction, it will simply overrun the input and coast along at the higher speed.

Description of the Second Alternative Embodiment of the Invention

Figure 5:
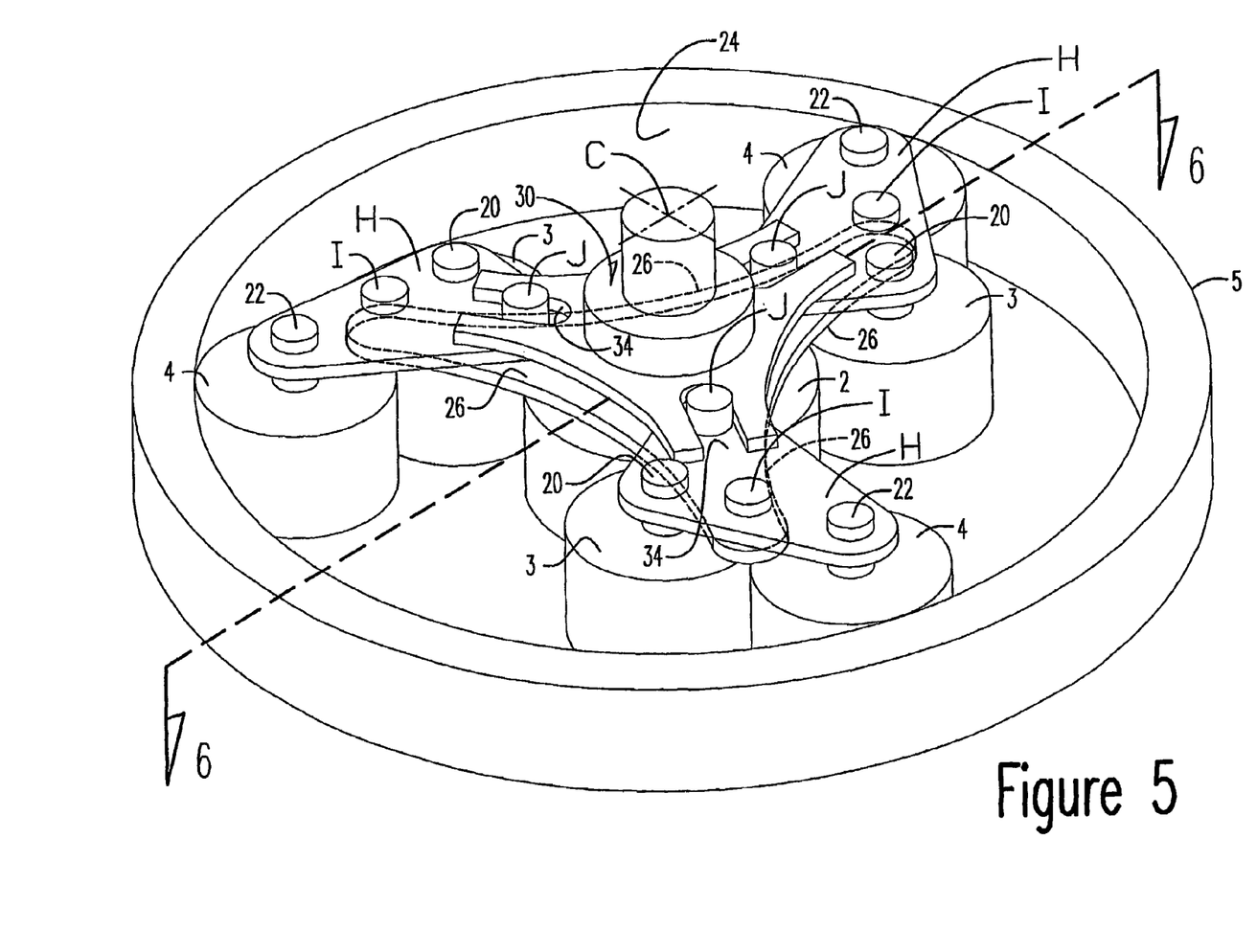
FIG. 5 is a perspective view of this invention in a planetary system.
Figure 6:
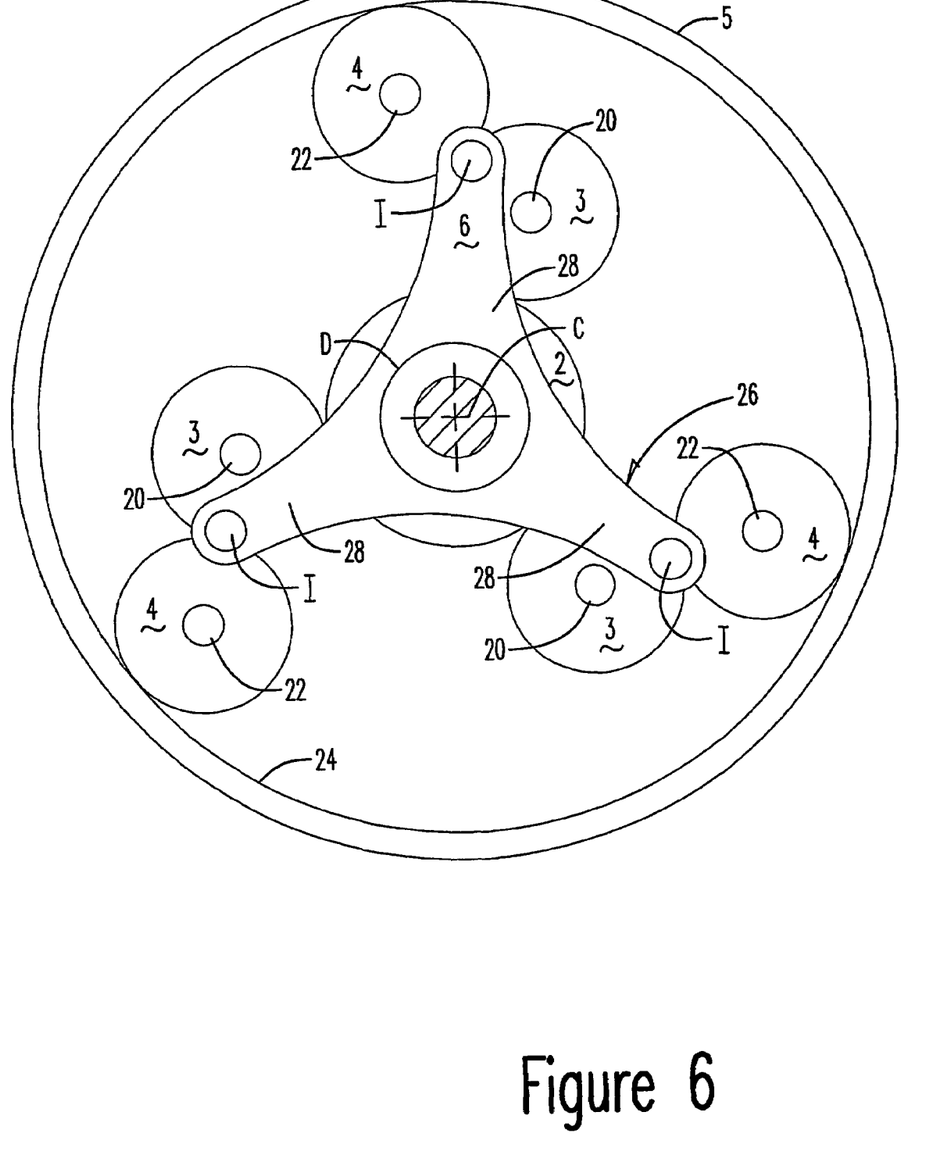
FIG. 6 is a sectional view taken on line 6—6 of FIG. 5.

FIGS. 5 and 6 show a modification of the structure of FIG. 1. Input roller 2 engages inner roller 3 which drives outer roller 4 which engages inner surface 24 of output roller 5. Links H support rollers 3 and 4 by pins 20 and 22, respectively. Links H are pivotally mounted by pins I to bracket 26 which has three radially extending arms 28. Bracket 26 is rotatably mounted on input shaft $C_1$. Drive bracket 30 with three radially extending arms 32 is rigidly secured to input shaft D. Arms 32 terminate in slots 34 which slidably and pivotally engage pins J on links H. Input shaft D drives bracket 30 which drives links H supported on the arms 28 of bracket 26. The rollers 4 and 3 function as rollers F and G in FIG. 1.

The "sun gear" 2 can be held in a stationary position with the receiving structure to rotate therearound.

Figure 7:
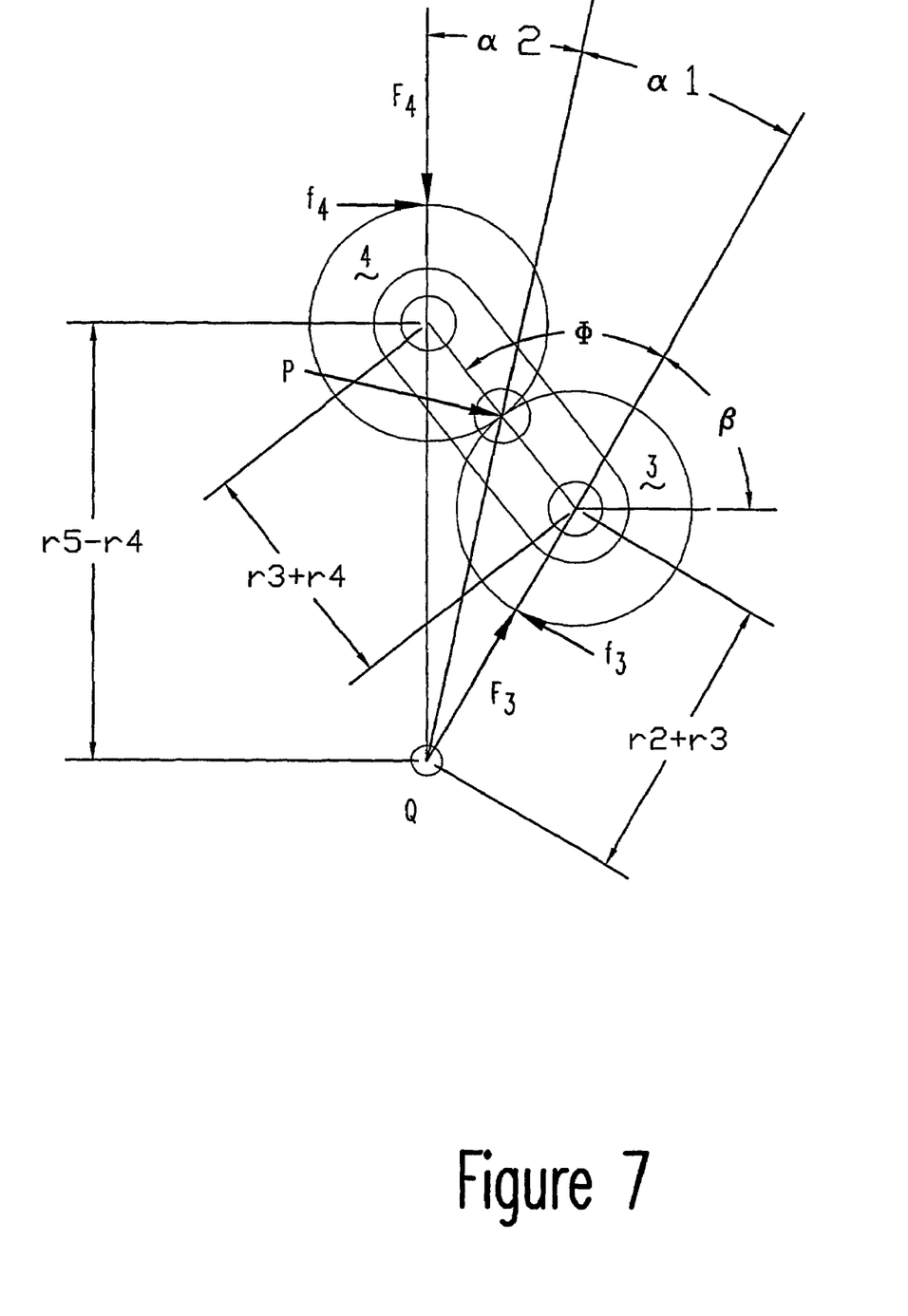
FIG. 7 is a schematic view of a pair of rollers reflecting the normal and tangential forces exerted thereon.

FIG. 7 shows one set of dimensioned intermediate rollers 3 and 4. Relationships were developed to calculate the angles $\phi$, $\chi_1$ and $\chi_2$ in terms of radii of the various members. In conjunction with friction coefficients, these angles are critical to ensure the speed changer's self-actuating characteristic.

The distances along horizontal and vertical directions were considered to obtain:

$$(r_2 + r_3)\cos\beta + (r_3 + r_4)\cos(\beta + \phi) = (r_5 - r_4)\cos(\beta + \alpha_1 + \alpha_2)$$

$$(r_2 + r_3)\sin\beta + (r_3 + r_4)\sin(\beta + \phi) = (r_5 - r_4)\sin(\beta + \alpha_1 + \alpha_2)$$

By squaring and adding these two equations to eliminate $\rho$, $\chi_1$, and $\chi_2$ and solve for $\phi$:

$$\phi = \cos^{-1}\left\{\frac{(r_5 - r_4)^2 - (r_3 + r_4)^2 - (r_2 + r_3)^2}{2(r_2 + r_3)(r_3 + r_4)}\right\}$$

Similarly, $\beta$ and $\phi$ were eliminated to solve for $(\alpha_1 + \alpha_2)$:

$$\alpha_1 + \alpha_2 = \cos^{-1}\left\{\frac{(r_2 + r_3)^2 + (r_5 - r_4)^2 - (r_3 + r_4)^2}{2(r_2 + r_3)(r_5 - r_4)}\right\}$$

By rearranging the same scalar equations so that when squared and added, $\beta$ and $\phi$, were eliminated.

This provides a solution for $\alpha_1$:

$$\alpha_1 = \cos^{-1}\left\{\frac{(r_2 + r_3)^2 + R^2 - r_3^2}{2R(r_2 + r_3)}\right\}$$

Where R is:

$$R = \{(r_2 + r_3)^2 + r_3^2 + 2r_3(r_2 + r_3)\cos\phi\}^{1/2}$$

Thus, $\phi$, $\alpha_1$ and $\alpha_2$ are calculated once the values are set for the radii of all the members.

Figure 8:
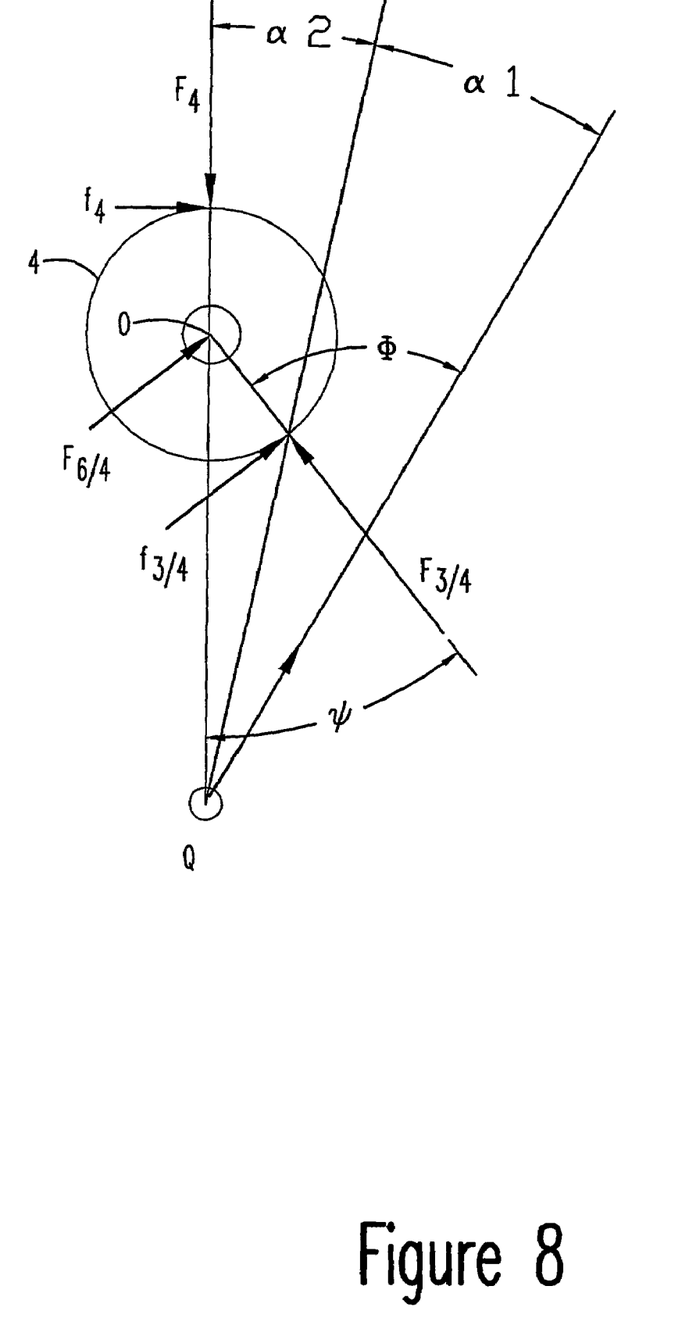
FIG. 8 is a free body diagram of roller 4 of FIG. 7.

Summation of forces and torques in FIGS. 7 and 8 produces two scalar equations for the normal forces, $F_3$ and $F_4$:

$$F_3 = \frac{\cos(\alpha_1 + \alpha_2) + \frac{(r_5 - r_2)}{R}\cos\alpha_2 - 1}{\sin(\alpha_1 + \alpha_2)} f$$

$$F_4 = \frac{\frac{(r_5 - r_2)}{R}\cos\alpha_1 + 1 - \cos(\alpha_1 + \alpha_2)}{\sin(\alpha_1 + \alpha_2)} f$$

where $F = F_3 = F_4$

To prevent slip between the input member E and the inner roller F (3) as well as between the outer roller G (4) and the output member K (i.e., FIG. 1):

$f \leq \mu_3 F_3$ $f \leq \mu_4 F_4$ where $\mu_3$ is the coefficient of friction between the input member E and the inner roller F and $\mu_4$ is the coefficient of friction between the outer roller G and the output member K.

By combining these inequalities with both of the above equations, the minimum requirements for the coefficients of friction to avoid slip are $$\mu_3 \geq \frac{\sin(\alpha_1 + \alpha_2)}{\cos(\alpha_1 + \alpha_2) + \frac{(r_5 - r_2)}{R}\cos\alpha_2 - 1}$$

$$\mu_4 \geq \frac{\sin(\alpha_1 + \alpha_2)}{\frac{(r_5 - r_2)}{R}\cos\alpha_1 + 1 - \cos(\alpha_1 + \alpha_2)}$$

Similarly, to ensure that slip does not occur between inner and outer rollers F and G:

$$\mu_{34} \geq \frac{\sin(\alpha_1 + \alpha_2)}{\left[\frac{(r_5 - r_2)}{R}\cos\alpha_1 + 1\right]\cos(\phi - \alpha_1 - \alpha_2) - \cos\phi}$$

where $\mu_{34}$ is the coefficient of friction between the inner and outer rollers 3 and 4.

Description of a Third Alternative Embodiment of the Invention

It should be understood that the input and output can be linear in nature and not just rotational. Further, this invention can use various combinations of linear input or output with rotational input or output. Two types of the linear concepts are shown in FIGS. 9 and 9a.

Figure 9:
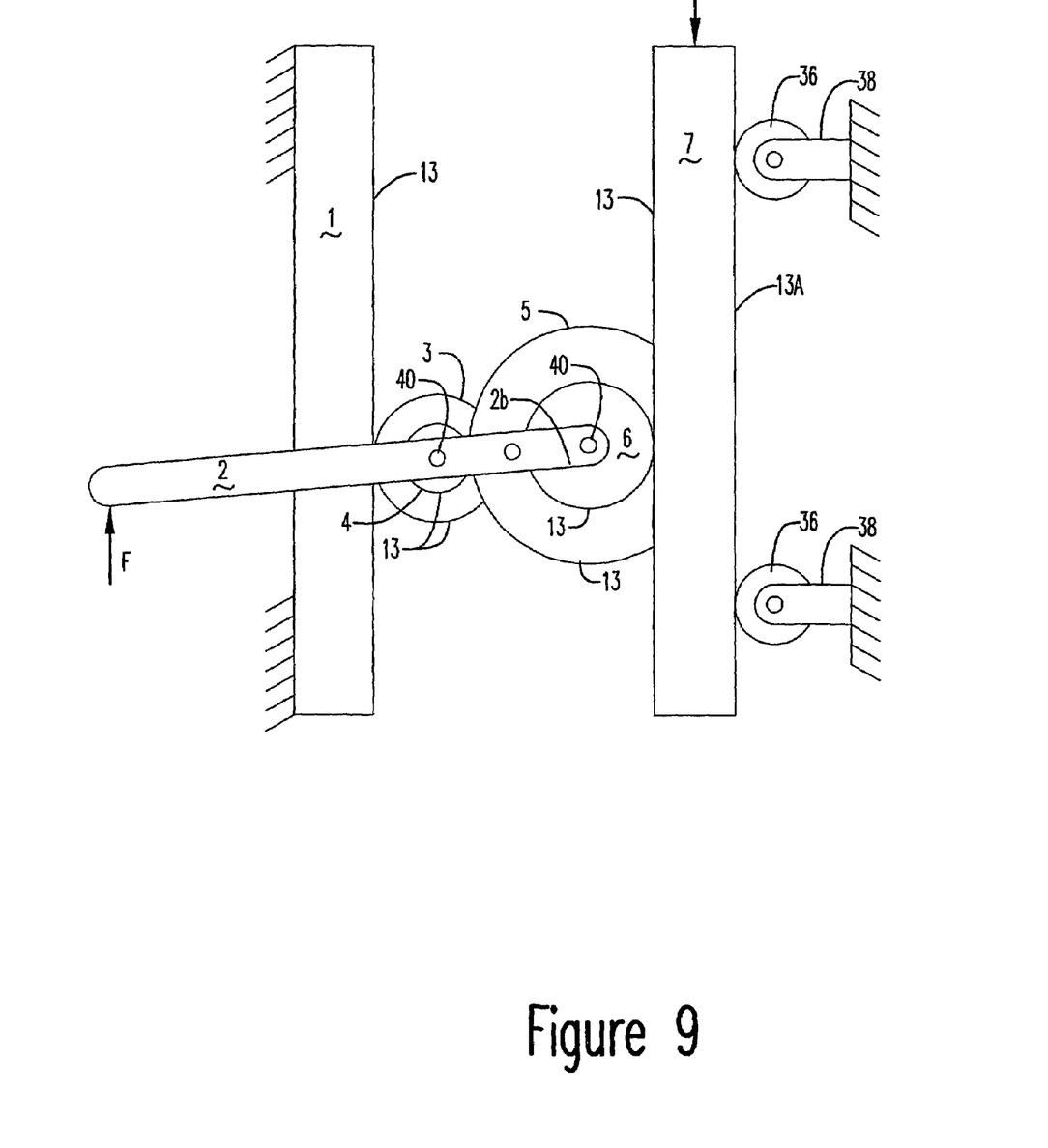
FIG. 9 is an elevational view of an alternative form of the invention utilizing a linear output.
Figure 9A:
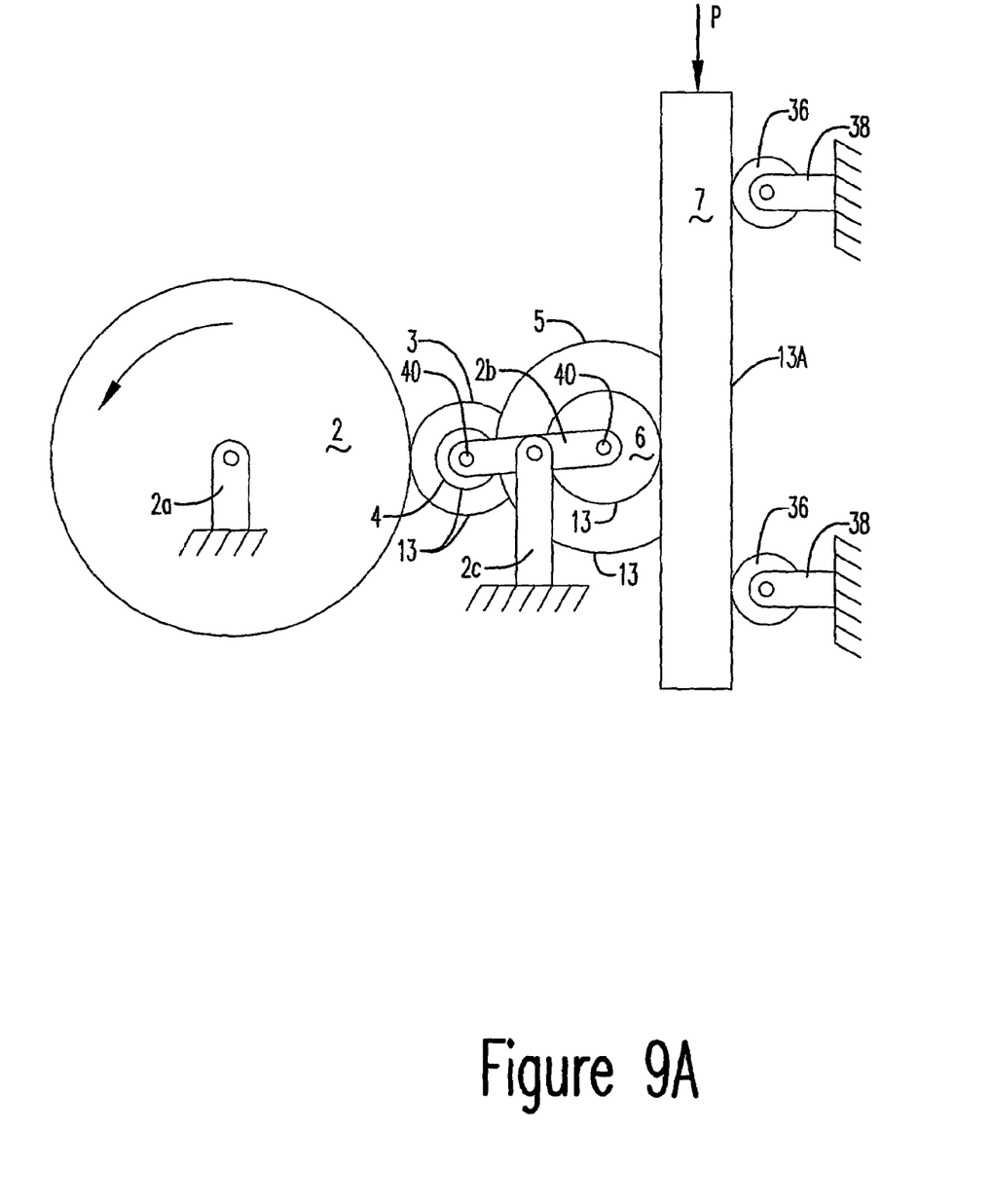
FIG. 9A is a view similar to that of FIG. 9 but shows an alternative way to obtain linear output.

In FIG. 9, a stationary linear member 1 is located opposite and in spaced relation to movable linear member 7. Both members have planar drive surfaces 13. Member 7 has an outer surface 13A in engagement with rolls 36 mounted on stationary brackets 38. An inclined arm 2 located in a plane parallel to the plane occupied by members 1 and 7 pivotally supports compound concentric rolls 3, 4 and 5, 6 by pins 40. Rolls 3 and 4 are of unitary construction as are rolls 5 and 6. All the rolls 3, 4, 5 and 6 have planar drive surfaces 13. Roll 3 engages linear member 1; roll 4 engages roll 5; and roll 6 engages linear member 7. As shown in FIG. 9, an input force F applied to the outer end of arm 2 will result in a linear output force P in member 7 through rolls 3–6. Thus, if F moves upward a distance d, and if roll 3 moves without slipping on linear member 1, roll 3 will rotate along with roll 4 in a counterclockwise direction.

Since there is no slip, points on the periphery of roll 3 that contact 1 at the initial and final times are separated by an arc length equal to d. Hence, the member compound roller consisting of rolls 3 and 4 rotates $$\theta_{34} = \frac{d}{r_3}$$

Then, if rolls 4 and 5 roll without slippage relative to one another, the compound roller consisting of rolls 5 and 6 rotates clockwise $$\theta_{56} = \frac{r_4}{r_5}\theta_{34}.$$

Roll 6 then rolls without slip relative to linear member 7 for a distance s given by $s = r_6\theta_{56}$ When the first two above equations are substituted into the foregoing equation, the value of s is $$s = \frac{r_4 r_6}{r_3 r_5}d$$

Finally, the distance member 7 moves relative to member 1 is $$y = d - s = \left(1 - \frac{r_4 r_6}{r_3 r_5}\right)d \quad (5)$$

If the product $r_4 r_6 < r_3 r_5$ then member 7 will move upwardly for a distance less than arm 2. If, however, the product $r_4 r_6 > r_3 r_5$ then member 7 moves down while member 2 moves upwardly. If the two products are equal, then member 7 remains stationary while member 2 moves upwardly.

The work input and work output are reflected in:

$Fd = Py \quad (8)$

When equation (5) is substituted into (8), F has a value of:

$$F = \left(1 - \frac{r_4 r_6}{r_3 r_5}\right)P$$

The arrangement shown in FIG. 9a is similar to that of FIG. 9 except arm 2 of FIG. 9 is substituted by roller 2 in FIG. 9a which is rotatably mounted on a fixed bracket 2a, and rolls 3, 4 and 5 and 6 are rotatable at fixed bracket 2c.

Description of Fourth Alternative Embodiment of the Invention

Figure 10:
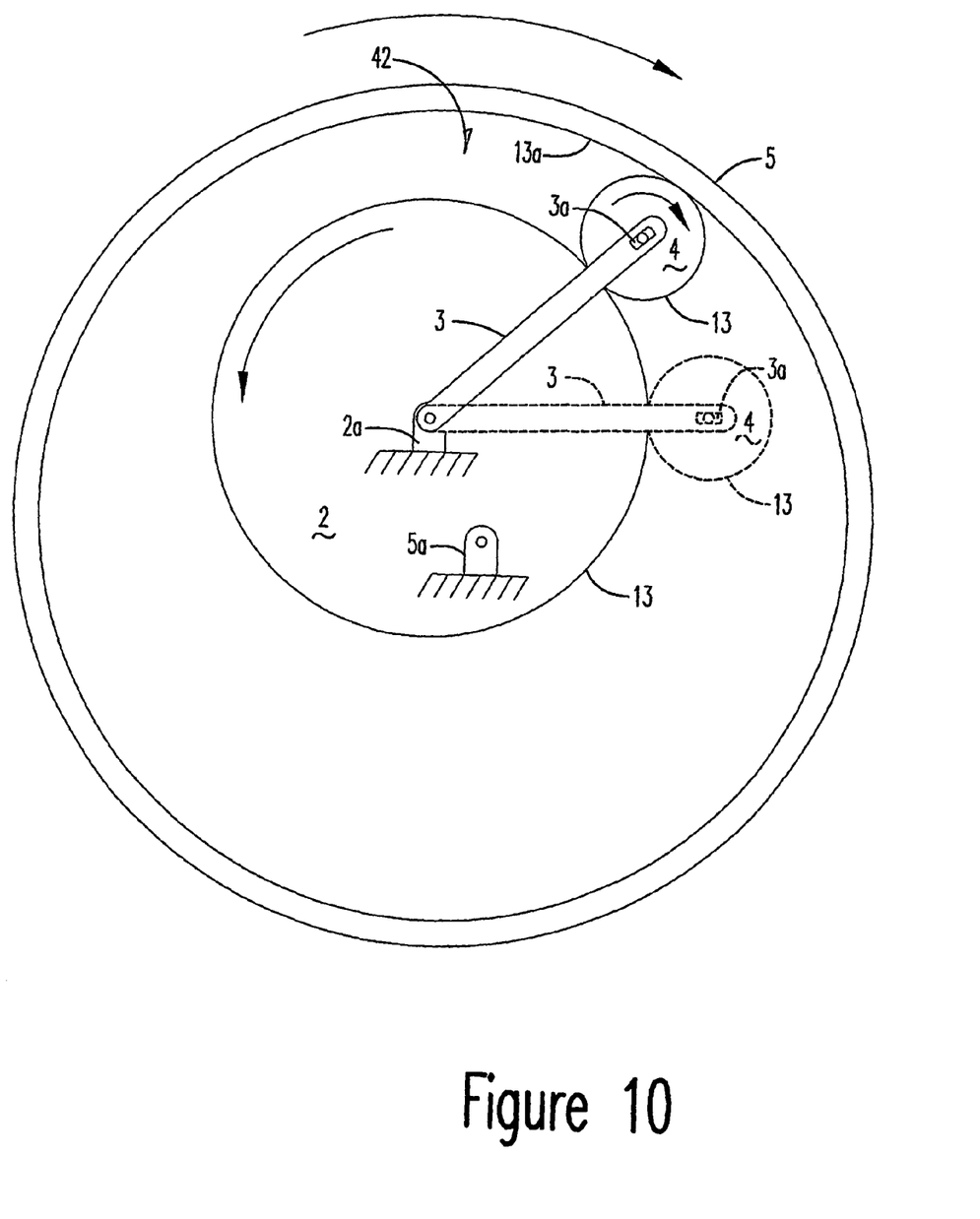
FIG. 10 is an elevational view of a further alternative embodiment of the invention showing the use of a single roller element.

In FIG. 10, input roll 2 rotates about fixed axis 2a within the circumference of output roll 5 which rotates about offset fixed axis 5a. An arm 3 has its inner end pivoted at 2a, and its outer end rotatably supports roll 4 within elongated radial notch 3a. Rolls 2, 4 and 5 have planar drive surfaces 13. Roll 4 engages the surface 13 of roll 2. The arm 3 is moved from the position of the dotted lines in FIG. 10 to the position of the solid lines by some means not shown. This causes roll 4 to engage rollers 2 and 5 by moving into the converging space 42, whereupon output roll 5 will rotate in a clockwise direction.

Figure 11:
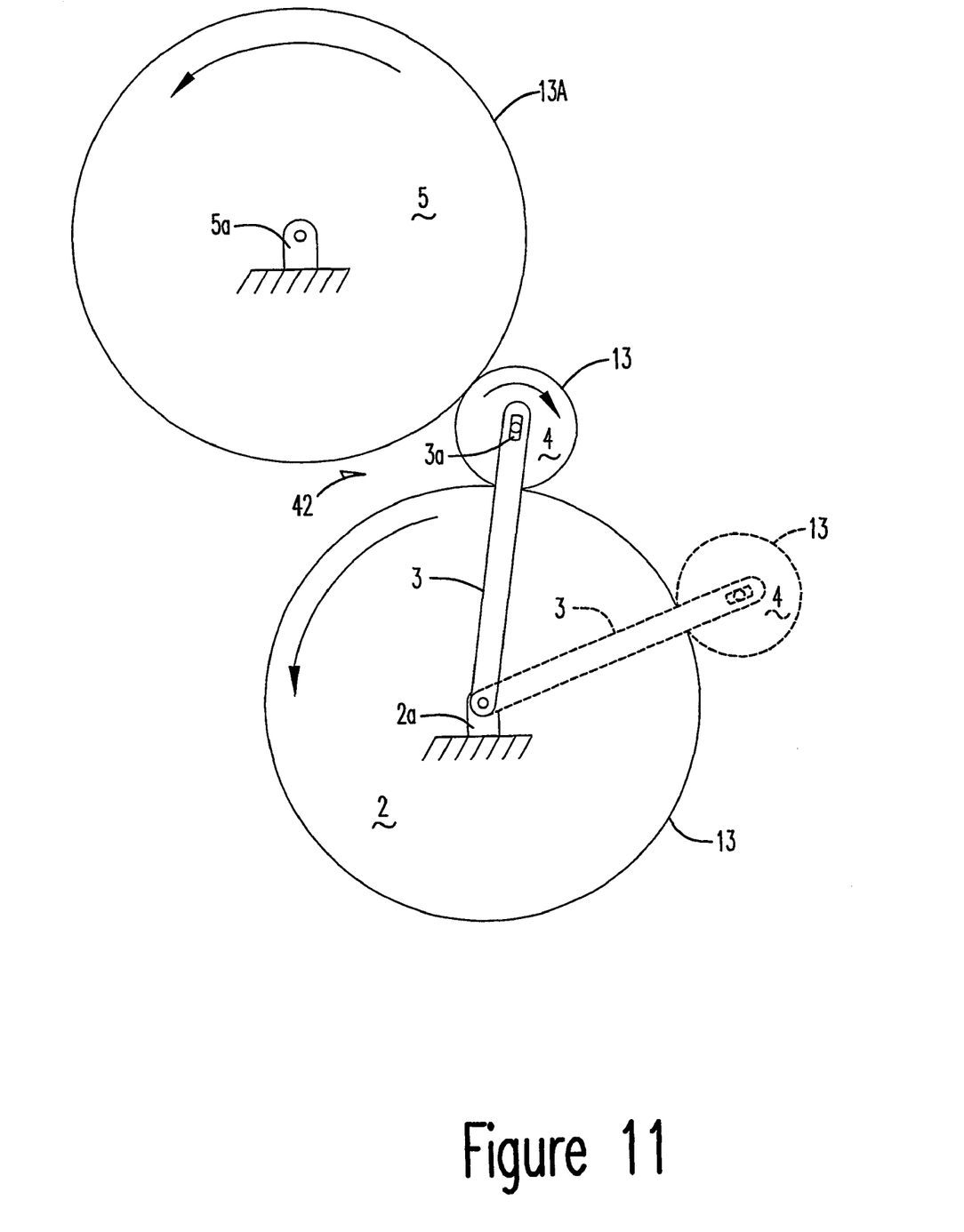
FIG. 11 is a view similar to that of FIG. 10 wherein the input element is located externally of the output element.

The arrangement in FIG. 11 is similar to that of FIG. 10 except that the axes of rotation 2a and 5a of rolls 2 and 5 are separated further so that roll 2 is not located within the periphery of roll 5. Rather, the rolls 2 and 5 are not overlapping, and roll 4 engages the outer planar drive surface 13a rather than the inner surface 13 as was the case in FIG. 10.

The geometry of the device is designed so that, given a specific coefficient of friction between the various contacting surfaces, the appropriate normal force will be induced, which will allow the required tractive force to be generated. Thus, the device will not slip, no matter how much load is applied to the output member. Parts will fracture before slippage occurs. Also, the device can be configured to operate in one direction only, and it will "overrun" in the opposite direction. Or, if one or more intermediate roller pairs are oriented in the opposing direction, the device can be operated in both directions.

From the foregoing, it is seen that this invention in its several embodiments will accomplish at least all of its stated objectives.

We claim:

1. A self-actuating traction drive speed changer, comprising, a movable force input element having a planar drive surface, a movable force output element having a planar drive surface and being connectable to an output load, a movable roller element having a planar drive surface operatively connected for rotation to the input element, and in frictional engagement with the planar drive surface of the output element so that movement of the input element will cause the planar drive surface of the roller element to engage and frictionally move the output element, and wherein the input element is circular in shape, the roller element is slidably and rotatably secured to the outer end of an arm having a second end pivotally secured to a center of the input element, the output element is circular in shape and has a perimeter surface radially spaced from a perimeter of the input element, and the roller element is movable into the space between the input and output elements to be drawn into tight rotational frictional engagement with the input and output elements.

2. The speed changer of claim 1 wherein the input element is a cylindrical roller.

3. The speed changer of claim 1 wherein the output element is a cylindrical roller.

4. The speed changer of claim 1 wherein the input and output elements are cylindrical rollers.

5. The speed changer of claim 1 wherein the roller element is operatively connected to the input element by a second cylindrical roller element.

6. The speed changer of claim 4 wherein the input and output elements have spaced apart axes of rotation.

7. The speed changer of claim 4 wherein the input and output elements have spaced apart axes of rotation extending through both the input and output elements.

8. The speed changer of claim 6 wherein the input element has a diameter less than the output element and is located within the output element.

9. A self-actuating fraction drive speed changer, comprising, a pair of spaced support elements, a movable force input element having a planar drive surface supported by one of the support elements, a movable force output element having a planar drive surface supported by the other of the support elements, an elongated link having a center and opposite ends pivotally secured at its center to one of the support elements, one each of first and second roller elements secured to the ends of the link, with each roller element having a planar drive surface, the planar drive surface of the first roller element being in friction engagement with the planar drive surface of the input element, whereupon rotation of the input element will rotate the first roller to pivot the link so that the planar drive surface of the second roller will engage the planar drive surface of the output element to rotate the output element.

10. The speed changer of claim 9 wherein additional links with first and second rollers are pivotally positioned between the input element and output elements in the manner of the first mentioned link to permit rotational motion to be imparted to the output element from the input element.

11. The speed changer of claim 9 wherein the input element and the output element rotate on a common rotational axis.

12. The speed changer of claim 11 wherein the input element is located radially inwardly from the output element.

13. The speed changer of claim 12 wherein the link has a center axis that is always disposed at an angle with respect to a radial line extending between center rotational axes of the input element and the first roller.

14. The speed changer of claim 9 wherein the second roller is rotatably secured to the link in an elongated slot on a longitudinal axis of the link.

15. The speed changer of claim 9 wherein the link is rotatably secured to one of the support members within an elongated radially extending slot in the support element.

16. The speed changer of claim 14 wherein the link is rotatably secured to a support member within an elongated radially extending slot in the support element.

17. The speed changer of claim 10 wherein the total number of links having first and second rollers is three, with the three links being symmetrically spaced about a periphery of the input element.

18. The speed changer of claim 10 wherein means are provided for selectively separating the second roller of some of the links from engagement with the output element.

19. A self-actuating traction drive speed changer, comprising, a speed changer assembly including a rotatable force input element rotatable about a first fixed axes, and a spaced rotatable movable force output element rotatable about a second fixed axis, an elongated arm pivotally connected at one end on the first fixed axis and having an opposite end rotatably supporting a roller element with a planar drive surface in contact with a planar drive surface on the input element, the output element having a planar drive surface spaced from the planar drive surface of the input element with the space therebetween being variably converging in width and having a minimum width less than the diameter of the roller element on the opposite end of the arm so that movement of the roller element into the variably converging space will permit the planar drive surface of roller element to engage the planar drive surface of both the input and output elements to impart rotation of the output element upon rotation of the input element.

20. The speed changer of claim 19 wherein the axis of rotation of the input element passes within an outer perimeter of the output element.

21. The speed changer of claim 19 wherein the axis of rotation of the input element passes outside an outer perimeter of the output element.

22. The speed changer of claim 19 wherein the roller element is mounted in an elongated slot in the arm.

23. A self-actuating traction drive speed changer, comprising a speed changer assembly including spaced movable input and output force elements concentric with one another and each having a planar drive surface, at least one roller element with a planar drive surface engaging the planar drive surfaces of the input and output elements, the roller element and the input and output elements being positioned in the assembly to provide a geometric configuration therebetween so that a coefficient of friction between the various planar drive surfaces will create a normal force to be induced therebetween which will cause a tractive force to be generated therebetween without slippage between the planar drive surfaces.

24. The speed changer of claim 23 wherein the input and output elements are cylindrical rollers.

25. The speed changer of claim 23 wherein at least one of the input and output elements is a cylindrical roller.

26. The speed changer of claim 23 wherein at least one of the input and output elements is a longitudinally movable member.

27. The speed changer of claim 23 wherein the said roller element is mounted on one end of a pivot link, and a second roller element is mounted on the opposite end of the link, with the said roller element being in engagement with the input element, and the second roller element is in engagement with the output element; the second roller element having a planar drive surface in contact with the planar drive surfaces of said roller and the output element.

28. A method of self actuating a drive speed changer, comprising, providing a support element, mounting a movable force input element having a planar drive surface on the support element, mounting a movable force output element having a planar drive surface on the support element, providing an elongated link having a center and opposite ends pivotally secured at its center to one of the support elements, placing first and second roller elements on the ends of the link, with each roller element having a planar drive surface, with the planar drive surface of the first roller element being in friction driving engagement with the planar drive surface of the input element, rotating the first roller by the input element to pivot the link so that the drive surface of the second roller will engage the planar drive surface of the output element to rotate the output element.

29. A method of self actuating a drive speed changer, comprising, providing a support element, mounting a movable force input element having a planar drive surface on the support element, mounting a movable force output element having a planar drive surface on the support element, placing first and second rollers with planar drive surfaces in operating surface contact with the input and output elements respectively, and rotating the first roller by the input element so that the drive surface of the second roller will engage the planar drive surface of the output element to move the output element, and wherein at least one of the input element and output element is adapted to move longitudinally.

30. The method of claim 29 wherein the output element is rotated.

31. The method of claim 29 wherein the output element is moved longitudinally.

32. A method of self-actuating a drive speed changer, comprising, providing spaced movable input and output force elements concentric with one another and each having planar drive surfaces, causing at least one roller element therebetween with a planar drive surface in engagement with the planar drive surfaces of input and output force elements, adjusting the geometric configuration of the roller element and the input and output force elements so that a coefficient of friction between the various planar drive surfaces will create a normal force to be induced therebetween which will cause a tractive force to be generated therebetween without slippage between the planar drive surfaces.

33. A self-actuating traction drive speed changer, comprising, a movable force input element having a planar drive surface, a movable force output element having a planar drive surface and being connectable to an output load, a movable roller element having a planar drive surface operatively connected for rotation to the input element, and in frictional engagement with the planar drive surface of the output element so that movement of the input element will cause the planar drive surface of the roller element to engage and frictionally move the output element wherein the roller element is located in between outer perimeters of the input shaft and the output element, and wherein the roller element is located between outer perimeters of the input shaft and the output element.

* * * * *

UNITED STATES PATENT AND TRADEMARK OFFICE
CERTIFICATE OF CORRECTION

PATENT NO.         : 7,118,512 B2
APPLICATION NO. : 10/363896
DATED                 : October 10, 2006
INVENTOR(S)       : Donald R. Flugrad, Jr. and Abir Z. Qamhiyah It is certified that error appears in the above-identified patent and that said Letters Patent is hereby corrected as shown below:

<u>Claim 9, Column 8, line7:</u>
DELETE:
"fraction"
REPLACE WITH
--traction--

Signed and Sealed this

Twelfth Day of December, 2006

JON W. DUDAS
*Director of the United States Patent and Trademark Office*